(12) United States Patent
Kemper

(10) Patent No.: US 9,433,279 B1
(45) Date of Patent: Sep. 6, 2016

(54) CARRIER APPARATUS FOR A PORTABLE COMPUTER

(71) Applicant: Thomas Kemper, Houston, TX (US)

(72) Inventor: Thomas Kemper, Houston, TX (US)

( * ) Notice: Subject to any disclaimer, the term of this patent is extended or adjusted under 35 U.S.C. 154(b) by 0 days.

(21) Appl. No.: 14/957,408

(22) Filed: Dec. 2, 2015

(51) Int. Cl.
*A45F 5/00* (2006.01)
*A45F 3/00* (2006.01)

(52) U.S. Cl.
CPC ............ *A45F 5/00* (2013.01); *A45F 2003/007* (2013.01); *A45F 2200/0525* (2013.01)

(58) Field of Classification Search
CPC ............... A45F 5/00; A45F 2003/007; A45F 2003/002; A45F 2003/025; A45F 3/02; A45F 2200/0525
See application file for complete search history.

(56) References Cited

U.S. PATENT DOCUMENTS

| | | | | |
|---|---|---|---|---|
| 3,541,976 A * | 11/1970 | Rozas | A47B 23/002 | 108/43 |
| 5,642,674 A * | 7/1997 | Joye, Sr. | A47B 23/002 | 108/25 |
| 5,667,114 A * | 9/1997 | Bourque | A45F 5/00 | 224/257 |
| 5,938,096 A * | 8/1999 | Sauer | A47B 23/002 | 190/109 |
| 6,349,864 B1 * | 2/2002 | Lee | A45F 3/14 | 224/257 |
| 6,381,127 B1 * | 4/2002 | Maddali | G06F 1/163 | 224/257 |
| 7,051,910 B2 * | 5/2006 | Sprague | A45C 13/30 | 224/262 |
| 7,778,026 B2 * | 8/2010 | Mitchell | A45C 9/00 | 206/522 |
| 7,780,049 B1 * | 8/2010 | Baranoski | A45F 3/14 | 211/117 |
| 8,104,655 B2 * | 1/2012 | Zhang | A45F 5/00 | 224/257 |
| 8,109,421 B2 * | 2/2012 | McLean | A45C 11/00 | 190/100 |
| D697,708 S * | 1/2014 | Denzer | D3/215 | |
| 8,807,406 B1 * | 8/2014 | Thach | A45F 5/00 | 224/153 |
| 8,844,448 B2 * | 9/2014 | Allen | A47B 23/002 | 108/43 |
| 9,004,330 B2 * | 4/2015 | White | A45F 5/00 | 224/256 |

* cited by examiner

*Primary Examiner* — Corey Skurdal
(74) *Attorney, Agent, or Firm* — Crossley & Stevenson Intellectual Property Law

(57) ABSTRACT

A carrier apparatus for a portable computer including a single rectangular flexible case having a top portion, a bottom portion, and a foldable horizontal crease disposed between the top portion and the bottom portion. A transparent pocket is disposed on an internal surface of the bottom portion of the case. A neck strap is attached to a top edge of the top portion of the case. A female snap fastener of a snap fastener is disposed on the bottom portion of the case, and a male snap fastener of the snap fastener is disposed on the top portion of the case. A plurality of a pair of side release buckles are attached to a plurality of a pair of straps attached to the case. Each of a right closure mechanism and a left closure mechanism of a pair of closure mechanism are disposed on the case.

3 Claims, 5 Drawing Sheets

CARRIER APPARATUS FOR A PORTABLE COMPUTER

BACKGROUND OF THE INVENTION

Various types of computer carriers are known in the prior art. However, what has been needed is a carrier apparatus for a portable computer including a single rectangular flexible case having a top portion, a bottom portion, and a foldable horizontal crease disposed between the top portion and the bottom portion. What has been further needed is a transparent pocket disposed on an internal surface of the bottom portion of the case, and a neck strap attached to a top edge of the top portion of the case. The pocket has a perimeter configured to fit a portable computer, and the neck strap has a circumference configured to allow the passage of a head and a neck of a wearer therethrough. Lastly, what has been needed is a snap fastener, a plurality of a pair of side release buckles attached to a plurality of a pair of straps attached to the case, and each of a right closure mechanism and a left closure mechanism of a pair of closure mechanisms disposed on the case. The right closure mechanism is configured to selectively secure a right edge of the bottom portion of the case with a right edge of the top portion of the case, and the left closure mechanism is configured to selectively secure a left edge of the bottom portion of the case with a left edge of the top portion of the case. The portable computer is removably disposable within the pocket, and the strap is removably engageable around the neck of the wearer. Each of the pair of closure mechanisms and the snap fastener are configured to selectively secure the bottom portion of the case to the top portion of the case when the portable computer is not in use by the wearer. The carrier apparatus for a portable computer thus helps to protect and ensure the safety of the portable computer since it can be both easily stored and used while in the apparatus. Furthermore, the carrier apparatus for a portable computer provides the wearer with a convenient, handless way in which to carry and store his portable computer when he is engaging in a number of activities including, but not limited to, riding a motorcycle, riding a bicycle, and walking.

FIELD OF THE INVENTION

The present invention relates to computer carriers, and more particularly, to a carrier apparatus for a portable computer.

SUMMARY OF THE INVENTION

The general purpose of the present carrier apparatus for a portable computer, described subsequently in greater detail, is to provide a carrier apparatus for a portable computer which has many novel features that result in a carrier apparatus for a portable computer which is not anticipated, rendered obvious, suggested, or even implied by prior art, either alone or in combination thereof.

To accomplish this, the present carrier apparatus for a portable computer includes a single continuous elongated rectangular flexible case having a top portion, a bottom portion, and a foldable horizontal crease disposed between the top portion and the bottom portion. Each of the top portion and the bottom portion has a right edge, a left edge, a top edge, an internal surface, and an external surface. A substantially rectangular transparent pocket is medially disposed on the internal surface of the bottom portion of the case. The pocket has a slot and a perimeter configured to fit a portable computer. A substantially circular neck strap is attached to the top edge of the top portion of the case. An opening of the neck strap has a circumference configured to allow the passage of a head and a neck of a wearer therethrough.

The carrier apparatus for a portable computer further includes a snap fastener having a female snap fastener and a male snap fastener. The female snap fastener is disposed on the internal surface of the bottom portion of the case proximal the top edge, and the male snap fastener is disposed on the internal surface of the top portion of the case proximal the top edge. Each of the female snap fastener and the male snap fastener is medially disposed between the right edge and the left edge of each of the bottom portion and the top portion, respectively, and the female snap fastener is configured to selectively engage with the male snap fastener.

A plurality of a pair of straps includes a top pair and a bottom pair. Each of the top pair and the bottom pair has an adjustable right strap and a left strap, and each of the right strap and the left strap has a right end and a left end. The left end of the right strap of each of the top pair and the bottom pair is attached to the right edge of the top portion of the case proximal the top edge and the crease, respectively, and the right end of the left strap of each of the top pair and the bottom pair is attached to the left edge of the top portion of the case proximal the top edge and the crease, respectively. A length of each of the top pair and the bottom pair is configured to fit around a chest of the wearer.

A plurality of a pair of side release buckles includes a top buckle and a bottom buckle. Each of the top buckle and the bottom buckle has a female portion and a male portion. The female portion of each of the top buckle and the bottom buckle is attached to the right end of the right strap of each of the top pair and the bottom pair, respectively, and the male portion of each of the top buckle and the bottom buckle is attached to the left end of the left strap of each of the top pair and the bottom pair, respectively. The female portion of the top buckle is configured to releasably engage the male portion of the top buckle, and the female portion of the bottom buckle is configured to releasably engage the male portion of the bottom buckle. Each of the top buckle and the bottom buckle is configured to releasably secure the top pair and the bottom pair around the chest of the wearer.

A pair of closure mechanisms includes a right closure mechanism and a left closure mechanism. Each of the right closure mechanism and the left closure mechanism is disposed on the right edge and the left edge, respectively, of each of the bottom portion of the case and the top portion of the case. The right closure mechanism is configured to selectively secure the right edge of the bottom portion of the case with the right edge of the top portion of the case, and the left closure mechanism is configured to selectively secure the left edge of the bottom portion of the case with the left edge of the top portion of the case. Each of the pair of closure mechanisms is optionally a zipper and, alternately, a hook and loop fastener.

The portable computer is removably disposable within the pocket, and the strap is removably engageable around the neck of the wearer. Each of the pair of closure mechanisms and the snap fastener are configured to selectively secure the case bottom portion to the case top portion when the portable computer is not in use by the wearer. Thus has been broadly outlined the more important features of the present carrier apparatus for a portable computer so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
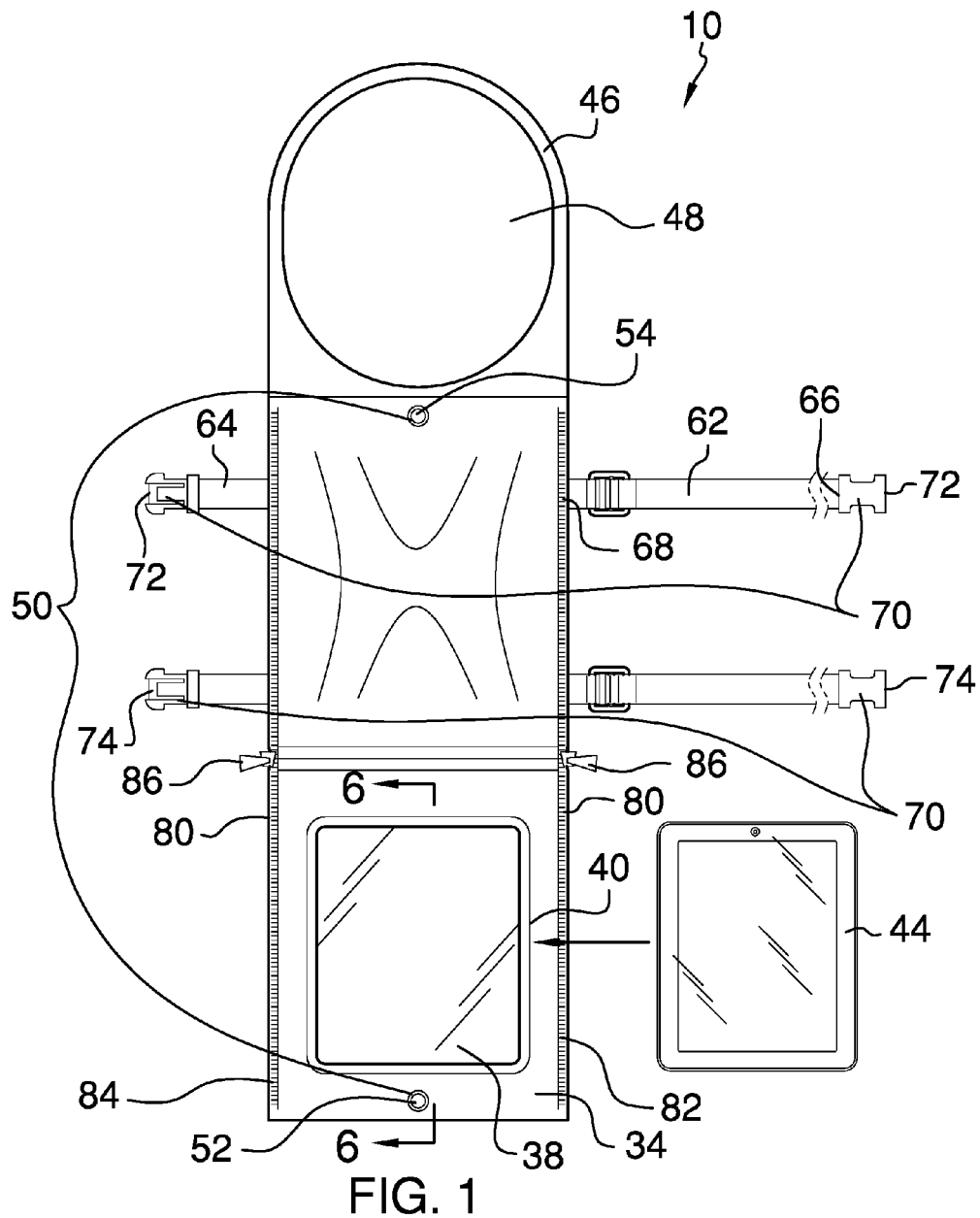
FIG. 1 is a front elevation view showing a case in an open position.
Figure 2:
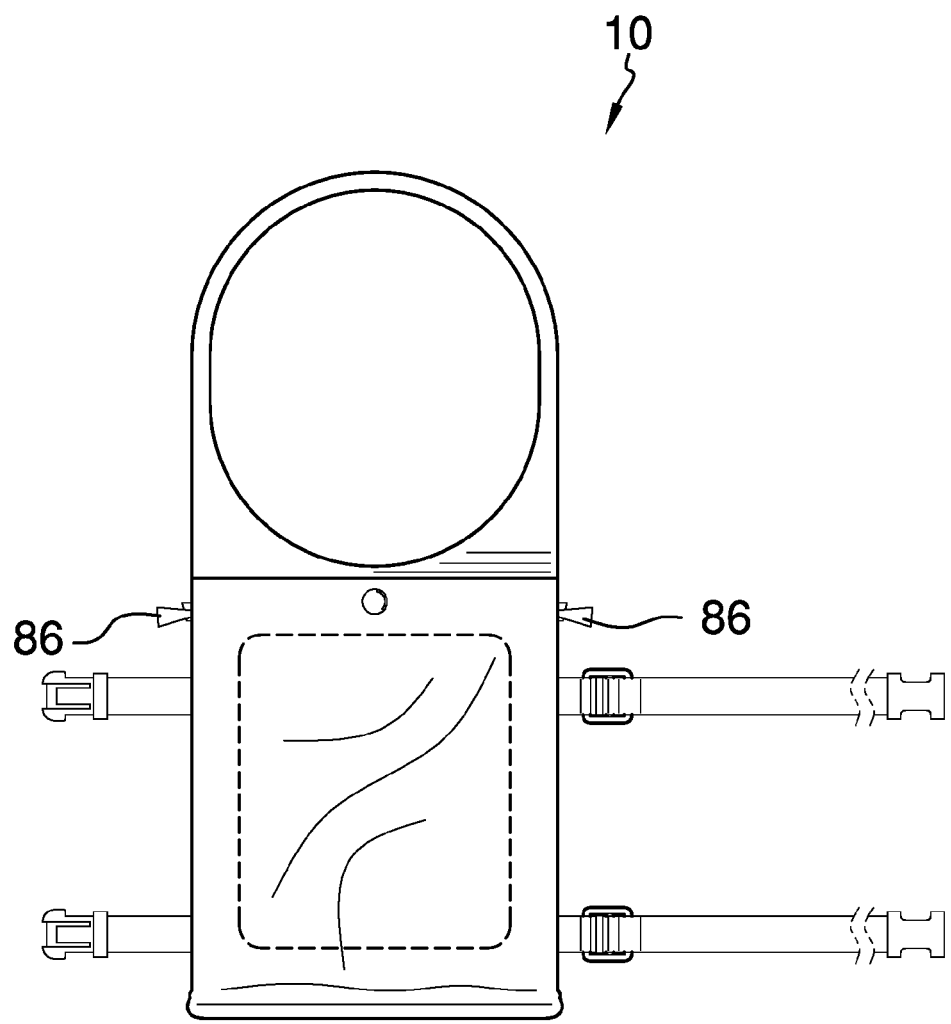
FIG. 2 is a front elevation view showing the case in a closed position.
Figure 3:
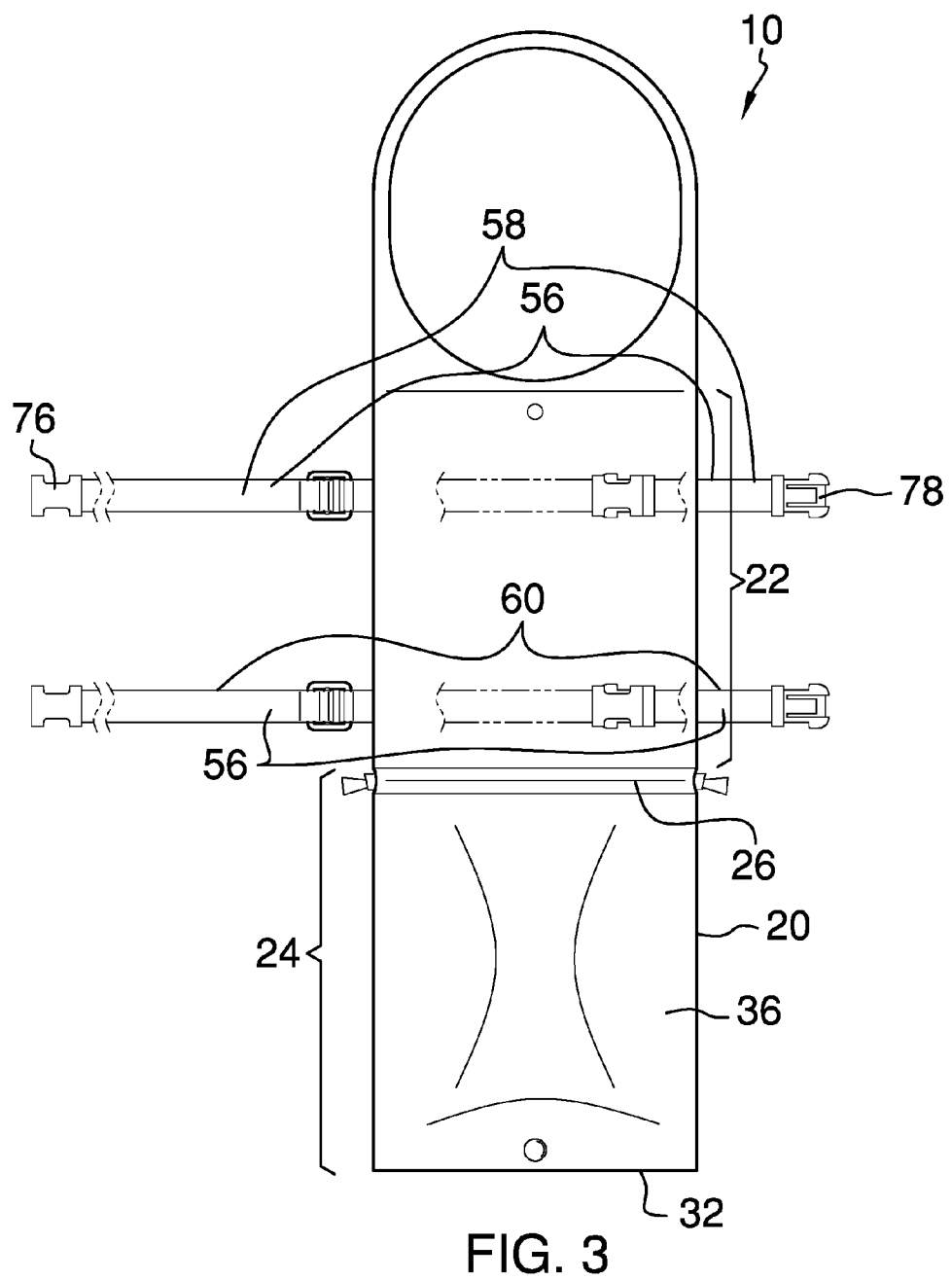
FIG. 3 is a rear elevation view.

With reference now to the drawings, and in particular FIGS. 1 through 6 thereof, an example of the instant carrier apparatus for a portable computer employing the principles and concepts of the present carrier apparatus for a portable computer and generally designated by the reference number 10 will be described.

Referring to FIGS. 1 through 6 the present carrier apparatus for a portable computer 10 is illustrated. The carrier apparatus for a portable computer 10 includes a single continuous elongated rectangular flexible case 20 having a top portion 22, a bottom portion 24, and a foldable horizontal crease 26 disposed between the top portion 22 and the bottom portion 24. Each of the top portion 22 and the bottom portion 24 has a right edge 28, a left edge 30, a top edge 32, an internal surface 34, and an external surface 36. A substantially rectangular transparent pocket 38 is medially disposed on the internal surface 34 of the bottom portion 24 of the case 20. The pocket 38 has a slot 40 and a perimeter configured to fit a portable computer 44. A substantially circular neck strap 46 is attached to the top edge 32 of the top portion 22 of the case 20. An opening 48 of the neck strap 46 has a circumference configured to allow the passage of a head and a neck of a wearer therethrough.

The carrier apparatus for a portable computer 10 further includes a snap fastener 50 having a female snap fastener 52 and a male snap fastener 54. The female snap fastener 52 is disposed on the internal surface 34 of the bottom portion 24 of the case 20 proximal the top edge 32, and the male snap fastener 54 is disposed on the internal surface 34 of the top portion 22 of the case 20 proximal the top edge 32. Each of the female snap fastener 52 and the male snap fastener 54 is medially disposed between the right edge 28 and the left edge 30 of each of the bottom portion 24 and the top portion 22, respectively, and the female snap fastener 52 is configured to selectively engage with the male snap fastener 54.

Figure 4:
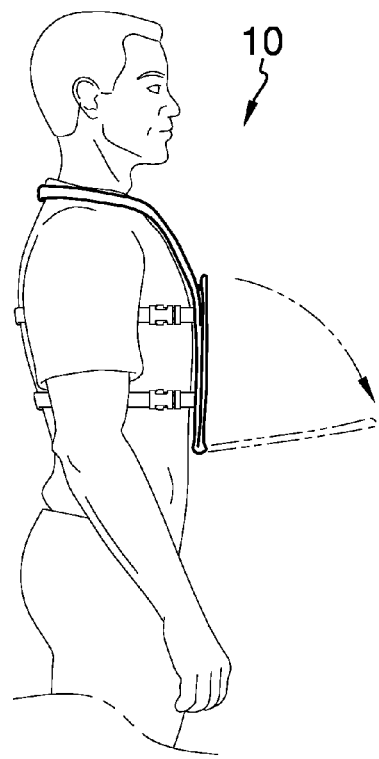
FIG. 4 is an in-use view.

A plurality of a pair of straps 56 includes a top pair 58 and a bottom pair 60. Each of the top pair 58 and the bottom pair 60 has an adjustable right strap 62 and a left strap 64, and each of the right strap 62 and the left strap 64 has a right end 66 and a left end 68. The left end 68 of the right strap 62 of each of the top pair 58 and the bottom pair 60 is attached to the right edge 28 of the top portion 22 of the case 20 proximal the top edge 32 and the crease 26, respectively, and the right end 66 of the left strap 64 of each of the top pair 58 and the bottom pair 60 is attached to the left edge 30 of the top portion 22 of the case 20 proximal the top edge 32 and the crease 26, respectively. As best shown in FIG. 4, a length of each of the top pair 58 and the bottom pair 60 is configured to fit around a chest of the wearer.

A plurality of a pair of side release buckles 70 includes a top buckle 72 and a bottom buckle 74. Each of the top buckle 72 and the bottom buckle 74 has a female portion 76 and a male portion 78. The female portion 76 of each of the top buckle 72 and the bottom buckle 74 is attached to the right end 66 of the right strap 62 of each of the top pair 58 and the bottom pair 60, respectively, and the male portion 78 of each of the top buckle 72 and the bottom buckle 74 is attached to the left end 68 of the left strap 64 of each of the top pair 58 and the bottom pair 60, respectively. The female portion 76 of the top buckle 72 is configured to releasably engage the male portion 78 of the top buckle 72, and the female portion 76 of the bottom buckle 74 is configured to releasably engage the male portion 78 of the bottom buckle 74. As best shown in FIG. 4, each of the top buckle 72 and the bottom buckle 74 is configured to releasably secure the top pair 58 and the bottom pair 60 around the chest of the wearer.

Figure 5:
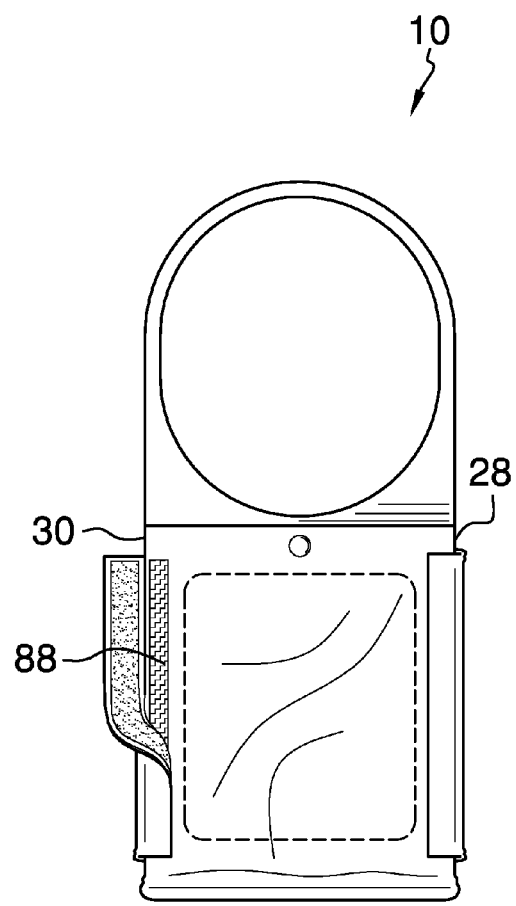
FIG. 5 is a front elevation view showing a pair of hook and loop fasteners.
Figure 6:
FIG. 6 is a cross-sectional view taken along line 6-6 of FIG. 1.

A pair of closure mechanisms 80 includes a right closure mechanism 82 and a left closure mechanism 84. Each of the right closure mechanism 82 and the left closure mechanism 84 is disposed on the right edge 28 and the left edge 30, respectively, of each of the bottom portion 24 of the case 20 and the top portion 22 of the case 20. The right closure mechanism 82 is configured to selectively secure the right edge 28 of the bottom portion 24 of the case 20 with the right edge 28 of the top portion 22 of the case 20, and the left closure mechanism 84 is configured to selectively secure the left edge 30 of the bottom portion 24 of the case 20 with the left edge 30 of the top portion 22 of the case 20. As best shown in FIGS. 1 and 5, each of the pair of closure mechanisms 80 is optionally a zipper 86 and, alternately, a hook and loop fastener 88.

The portable computer 44 is removably disposable within the pocket 38, and the strap 46 is removably engageable around the neck of the wearer. Each of the pair of closure mechanisms 80 and the snap fastener 50 are configured to selectively secure the case bottom portion 24 to the case top portion 22 when the portable computer 44 is not in use by the wearer.

What is claimed is:

1. A carrier apparatus for a portable computer comprising:

a single continuous elongated rectangular flexible case having a top portion, a bottom portion, and a foldable horizontal crease disposed between the top portion and the bottom portion, each of the top portion and the bottom portion having a right edge, a left edge, a top edge, an internal surface, and an external surface;

a substantially rectangular transparent pocket medially disposed on the internal surface of the case bottom portion, the pocket having a slot and a perimeter configured to fit a portable computer;

a substantially circular neck strap attached to the top edge of the case top portion, wherein an opening of the neck strap has a circumference configured to allow the passage of a head and a neck of a wearer therethrough;

a snap fastener having a female snap fastener and a male snap fastener, wherein the female snap fastener is disposed on the internal surface of the case bottom portion proximal the top edge, and the male snap fastener is disposed on the internal surface of the case top portion proximal the top edge, wherein each of the female snap fastener and the male snap fastener is medially disposed between the right edge and the left edge of each of the bottom portion and the top portion, respectively, wherein the female snap fastener is configured to selectively engage with the male snap fastener;

a plurality of a pair of straps comprising a top pair and a bottom pair, each of the top pair and the bottom pair having an adjustable right strap and a left strap, each of the right strap and the left strap having a right end and a left end, wherein the left end of the right strap of each of the top pair and the bottom pair is attached to the right edge of the case top portion proximal the top edge and the crease, respectively, and the right end of the left strap of each of the top pair and the bottom pair is attached to the left edge of the case top portion proximal the top edge and the crease, respectively;

wherein a length of each of the top pair and the bottom pair is configured to fit around a chest of the wearer;

a plurality of a pair of side release buckles comprising a top buckle and a bottom buckle, each of the top buckle and the bottom buckle having a female portion and a male portion, wherein the female portion of each of the top buckle and the bottom buckle is attached to the right end of the right strap of each of the top pair and the bottom pair, respectively, and the male portion of each of the top buckle and the bottom buckle is attached to the left end of the left strap of each of the top pair and the bottom pair, respectively, wherein the female portion of the top buckle is configured to releasably engage the male portion of the top buckle, and the female portion of the bottom buckle is configured to releasably engage the male portion of the bottom buckle;

wherein each of the top buckle and the bottom buckle is configured to releasably secure the top pair and the bottom pair around the chest of the wearer; and a pair of closure mechanisms comprising a right closure mechanism and a left closure mechanism, each of the right closure mechanism and the left closure mechanism disposed on the right edge and the left edge, respectively, of each of the case bottom portion and the case top portion, wherein the right closure mechanism is configured to selectively secure the right edge of the case bottom portion with the right edge of the case top portion, and the left closure mechanism is configured to selectively secure the left edge of the case bottom portion with the left edge of the case top portion;

wherein the portable computer is removably disposable within the pocket;

wherein the strap is removably engageable around the neck of the wearer;

wherein each of the pair of closure mechanisms and the snap fastener are configured to selectively secure the case bottom portion to the case top portion when the portable computer is not in use by the wearer.

2. The carrier apparatus for a portable computer of claim 1 wherein each of the pair of closure mechanisms is a zipper.

3. The carrier apparatus for a portable computer of claim 1 wherein each of the pair of closure mechanisms is a hook and loop fastener.

* * * * *